United States Patent
Patil

(10) Patent No.: US 11,922,026 B2
(45) Date of Patent: Mar. 5, 2024

(54) PREVENTING DATA LOSS IN A FILESYSTEM BY CREATING DUPLICATES OF DATA IN PARALLEL, SUCH AS CHARGING DATA IN A WIRELESS TELECOMMUNICATIONS NETWORK

(71) Applicant: T-Mobile USA, Inc., Bellevue, WA (US)

(72) Inventor: Vaishali Patil, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 129 days.

(21) Appl. No.: 17/673,510

(22) Filed: Feb. 16, 2022

(65) Prior Publication Data

US 2023/0259285 A1 Aug. 17, 2023

(51) Int. Cl.
*G06F 3/06* (2006.01)
*H04L 47/52* (2022.01)

(52) U.S. Cl.
CPC .......... *G06F 3/0619* (2013.01); *G06F 3/0617* (2013.01); *G06F 3/065* (2013.01); *G06F 3/0659* (2013.01); *G06F 3/067* (2013.01); *H04L 47/522* (2013.01)

(58) Field of Classification Search
CPC ...... G06F 3/0619; G06F 3/0617; G06F 3/065; G06F 3/0659; G06F 3/067; H04L 47/522
See application file for complete search history.

(56) References Cited

U.S. PATENT DOCUMENTS

| | | |
|---|---|---|
| 5,519,701 A | 5/1996 | Colmant et al. |
| 5,581,735 A | 12/1996 | Kajitani et al. |
| 5,931,903 A | 8/1999 | Fishler et al. |
| 6,347,341 B1 | 2/2002 | Glassen et al. |
| 6,446,077 B2 | 9/2002 | Straube et al. |
| 6,654,831 B1 | 11/2003 | Otterness et al. |
| 6,687,905 B1 | 2/2004 | Day et al. |
| 6,804,815 B1 | 10/2004 | Kerr et al. |
| 7,007,143 B2 | 2/2006 | Cochran |
| 7,024,582 B2 | 4/2006 | Loy et al. |
| 7,065,540 B2 | 6/2006 | Chandrasekaran et al. |
| 7,219,127 B2 | 5/2007 | Huck et al. |
| 7,295,565 B2 | 11/2007 | Hendel |
| 7,325,111 B1 | 1/2008 | Jiang |
| 7,327,749 B1 | 2/2008 | Mott |

(Continued)

FOREIGN PATENT DOCUMENTS

| | | |
|---|---|---|
| CN | 109074261 A | 12/2018 |
| CN | 106471485 B | 1/2019 |

(Continued)

*Primary Examiner* — Eric Cardwell
(74) *Attorney, Agent, or Firm* — Perkins Coie LLP

(57) ABSTRACT

The disclosed system prevents data loss by creating duplicates of data in parallel. The system creates in parallel a first multiplicity of copies of the data to store in a sub-queue associated with a queue. The system creates a second multiplicity of copies of the data, and stores in parallel the second multiplicity of copies of the data in multiple independent memory locations. The system obtains a copy of the data among the first multiplicity of copies of the data, and creates a third multiplicity of copies of the data based on the copy of the data. The system distributes in parallel the third multiplicity of copies of the data to multiple independent data storage devices.

17 Claims, 8 Drawing Sheets

(56) References Cited

U.S. PATENT DOCUMENTS

| | | |
|---|---|---|
| 7,490,183 B2 | 2/2009 | Branigan et al. |
| 7,493,446 B2 | 2/2009 | Arimilli et al. |
| 7,546,367 B2 | 6/2009 | Mahdavi |
| 7,552,294 B1 | 6/2009 | Justiss |
| 7,814,243 B2 | 10/2010 | Hamilton |
| 7,937,364 B1 | 5/2011 | Chandrasekaran et al. |
| 8,265,092 B2 | 9/2012 | Craddock et al. |
| 8,332,367 B2 | 12/2012 | Bhattacherjee et al. |
| 8,341,134 B2 | 12/2012 | Bourbonnais et al. |
| 8,359,599 B2 | 1/2013 | Coulter et al. |
| 8,370,395 B1 | 2/2013 | Gupta et al. |
| 8,381,230 B2 | 2/2013 | Dozsa et al. |
| 8,458,443 B2 | 6/2013 | Tramm et al. |
| 8,700,873 B2 | 4/2014 | Cantu et al. |
| 8,874,522 B2 | 10/2014 | Guo et al. |
| 9,087,020 B1 | 7/2015 | Amacker et al. |
| 9,141,440 B2 | 9/2015 | Chopra |
| 9,426,081 B2 | 8/2016 | Elhaddad et al. |
| 9,571,426 B2 | 2/2017 | Agarwal et al. |
| 9,577,961 B2 | 2/2017 | Word |
| 9,584,593 B2 | 2/2017 | Word |
| 9,668,022 B2 | 5/2017 | Fishwick |
| 9,672,274 B1 | 6/2017 | Goo |
| 9,823,979 B2 | 11/2017 | Gokhale et al. |
| 9,838,476 B2 | 12/2017 | Maturana et al. |
| 10,073,714 B2 | 9/2018 | Rimoni |
| 10,089,185 B2 | 10/2018 | Tekade et al. |
| 10,178,168 B2 | 1/2019 | Annamalai et al. |
| 10,289,306 B1 | 5/2019 | Feng et al. |
| 10,594,449 B2 | 3/2020 | Liang |
| 10,976,967 B2 | 4/2021 | Kang et al. |
| 10,983,957 B2 | 4/2021 | Bowman |
| 11,025,546 B2 | 6/2021 | Holla et al. |
| 11,080,206 B2 | 8/2021 | Munshi et al. |
| 11,086,608 B2 | 8/2021 | Bequet et al. |
| 2002/0004835 A1 | 1/2002 | Yarbrough |
| 2002/0038228 A1 | 3/2002 | Waldorf et al. |
| 2003/0217119 A1* | 11/2003 | Raman .................. H04L 69/329 709/219 |
| 2004/0184470 A1 | 9/2004 | Holden |
| 2004/0218592 A1 | 11/2004 | Nagar et al. |
| 2005/0027892 A1* | 2/2005 | McCabe .................. G06F 3/065 709/253 |
| 2005/0033728 A1 | 2/2005 | James et al. |
| 2006/0195663 A1 | 8/2006 | Arndt et al. |
| 2007/0121822 A1 | 5/2007 | Carnale et al. |
| 2007/0143497 A1* | 6/2007 | Kottomtharayil ....... G06F 16/10 709/238 |
| 2007/0168525 A1 | 7/2007 | Deleon et al. |
| 2007/0168567 A1 | 7/2007 | Boyd et al. |
| 2007/0168754 A1 | 7/2007 | Zohar et al. |
| 2007/0204275 A1 | 8/2007 | Alshab et al. |
| 2009/0077268 A1* | 3/2009 | Craddock ........... H04L 49/9078 709/250 |
| 2009/0150569 A1 | 6/2009 | Kumar et al. |
| 2009/0282169 A1 | 11/2009 | Kumar et al. |
| 2011/0099552 A1 | 4/2011 | Avni et al. |
| 2011/0137889 A1 | 6/2011 | Nayberg |
| 2012/0151063 A1 | 6/2012 | Yang et al. |
| 2013/0227161 A1 | 8/2013 | Vasudevan et al. |
| 2015/0244804 A1 | 8/2015 | Warfield et al. |
| 2016/0036675 A1 | 2/2016 | Zhuang et al. |
| 2017/0265221 A1 | 9/2017 | Yang et al. |
| 2020/0035344 A1 | 1/2020 | Jaskela et al. |
| 2021/0248451 A1 | 8/2021 | Rajamani et al. |
| 2021/0255843 A1 | 8/2021 | Bequet et al. |
| 2022/0083657 A1* | 3/2022 | Karr ........................ G06F 21/64 |

FOREIGN PATENT DOCUMENTS

| | | |
|---|---|---|
| CN | 109257320 A | 1/2019 |
| CN | 109298950 A | 2/2019 |
| CN | 110110006 A | 8/2019 |
| CN | 110119396 A | 8/2019 |
| CN | 110232049 A | 9/2019 |
| CN | 110244907 A | 9/2019 |
| CN | 111475313 A | 7/2020 |
| CN | 108416665 B | 8/2020 |
| CN | 110109586 B | 2/2021 |
| CN | 110019231 B | 6/2021 |
| CN | 108055343 B | 7/2021 |
| CN | 113094272 A | 7/2021 |
| CN | 113127217 A | 7/2021 |
| CN | 107798460 B | 8/2021 |
| DE | 102017104817 A1 | 10/2017 |
| DE | 102013205973 B4 | 8/2019 |
| DE | 112017007865 T5 | 5/2020 |
| DE | 102020121814 A1 | 4/2021 |
| DE | 102020133262 A1 | 8/2021 |
| EP | 0995297 A1 | 4/2000 |
| EP | 1026583 A2 | 8/2000 |
| EP | 1066568 A1 | 1/2001 |
| EP | 1217557 A2 | 6/2002 |
| EP | 2754064 A1 | 7/2014 |
| EP | 2761481 A1 | 8/2014 |
| EP | 3283960 A2 | 2/2018 |
| EP | 1412858 B1 | 4/2018 |
| EP | 3308260 A1 | 4/2018 |
| EP | 3320658 B1 | 12/2018 |
| EP | 2235926 B1 | 5/2019 |
| EP | 2195724 B1 | 10/2019 |
| EP | 1671231 B1 | 11/2019 |
| JP | 2000250856 A | 9/2000 |
| JP | 2005318073 A | 11/2005 |
| JP | 4607984 B2 | 10/2010 |
| JP | 5467625 B2 | 2/2014 |
| KR | 102292050 B1 | 8/2021 |
| WO | 2004063866 A2 | 7/2004 |
| WO | 2009117691 A2 | 9/2009 |
| WO | 2016198669 A1 | 12/2016 |
| WO | 2020119115 A1 | 6/2020 |
| WO | 2020119709 A1 | 6/2020 |
| WO | 2020177384 A1 | 9/2020 |
| WO | 2020187324 A1 | 9/2020 |
| WO | 2020224374 A1 | 11/2020 |
| WO | 2020226979 A2 | 11/2020 |
| WO | 2020233054 A1 | 11/2020 |
| WO | 2020238429 A1 | 12/2020 |
| WO | 2020238737 A1 | 12/2020 |
| WO | 2021031408 A1 | 2/2021 |
| WO | 2021051589 A1 | 3/2021 |
| WO | 2021051882 A1 | 3/2021 |

* cited by examiner

PREVENTING DATA LOSS IN A FILESYSTEM BY CREATING DUPLICATES OF DATA IN PARALLEL, SUCH AS CHARGING DATA IN A WIRELESS TELECOMMUNICATIONS NETWORK

BACKGROUND

Today's large volume of data is stored in filesystems that are backed up in various secondary locations, in case the primary filesystem fails. Usually, the secondary locations are physically remote from the primary location to guard against electric outage or natural disaster affecting the geographical area of the primary filesystem. The physical distance causes a delay in transfer of data from the primary to the secondary filesystem. In addition, the transfer between the primary and secondary filesystem is typically not continuous and occurs at predetermined intervals. When there is a large volume of data coming into the primary filesystem, the above-mentioned delays can lead to data loss, if the primary filesystem goes down between the predetermined intervals, and/or the data en route to the secondary filesystem is lost. Such data loss can be particularly damaging to certain industries, such as loss by a wireless service provider of subscriber billing or charging data in a wireless telecommunications network.

BRIEF DESCRIPTION OF THE DRAWINGS

Detailed descriptions of implementations of the present invention will be described and explained through the use of the accompanying drawings.

Figure 1:
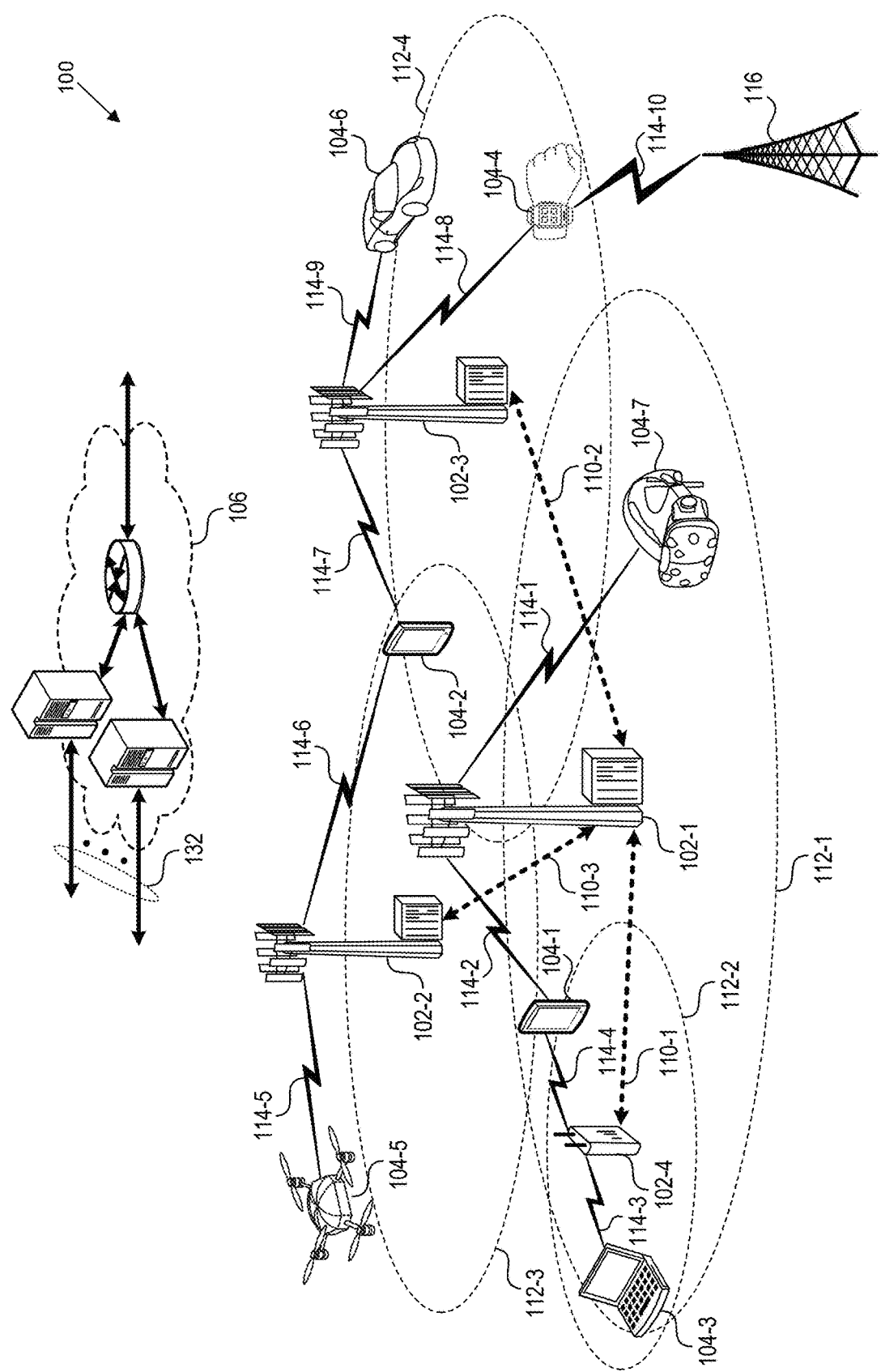
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed is a system and method to prevent data loss in a filesystem by creating multiple copies of the data at various stages of the system, and creating those redundancies in parallel, so that loss of one redundancy does not mean loss of the data, particularly if the data is sensitive to latency and loss, such as subscriber or charging data for millions of subscribers to a wireless telecommunications network. The system can receive, from an application, data to store in the filesystem. The system can distribute the data to a first queue among multiple queues. The queue is created in random-access memory (RAM) and not on disk. Consequently, the latency to write the data to the queue is low, on the order of milliseconds, and there is very low probability that the data will be lost while being copied to the queue. For example, the latency to write the data to the queue can be approximately 3 milliseconds, which includes writing to memory and disk. The multiple queues can be ordered in a sequence, where an initial queue in the sequence follows a last queue in the sequence. The system distributes the data to the queues in a round-robin fashion. For example, after distributing the data to each of the queues in the sequence in order, the system repeats the cycle by distributing the data to the initial queue.

The data stored in the queues follows telecommunication industry regulations. The data is very high-volume data, with high throughput. The data is time sensitive and needs to be retained for eight years to comply with the regulatory requirements. The loss of data has large implications to the wireless telecommunication network. Even a small downtime, on the order of seconds, can cause significant data loss, which can cause the wireless telecommunication network to be out of compliance with the regulatory requirements.

The system can in parallel create redundant data storage. The system can in parallel distribute the data from the first queue to multiple data adapters. To distribute the data, the system can create multiple copies of the data, one data copy for each data adapter. The system can send a copy of the data to a data adapter. Each adapter among the multiple data adapters receives the copy of the data from each queue among the multiple queues. Each data adapter can in parallel store the copy of the data on a storage device among multiple data storage devices. Each storage device among the multiple data storage devices corresponds to each data adapter among the multiple data adapters. The correspondence between the storage devices and the data adapters can be one-to-one.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network base station, a NAN can be a wireless local area network access point, such as an Institute of Electrical and Electronics Engineers 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband, vehicle-to-everything, machine-to-machine, machine-to-everything, ultra-reliable low-latency communication, machine-type communication, etc.).

The network 100 can include a 5G network 100 and/or an LTE/LTE-A or other network. In an LTE/LTE-A network, the term eNB is used to describe the base stations 102, and in 5G new radio networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group or wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol layer can be IP-based. A Radio Link Control layer then performs packet segmentation and reassembly to communicate over logical channels. A Medium Access Control (MAC) layer can perform priority handling and multiplexing of logical channels into transport channels. The MAC layer can also use Hybrid ARQ to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/NR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as user equipment, customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device communications.

The communication links 114-1 through 114-10 (also referred to individually as "communication link 114" or collectively as "communication links 114") shown in network 100 include uplink transmissions from a wireless device 104 to a base station 102, and/or downlink transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (e.g., using paired spectrum resources) or time division duplex operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output techniques that can take advantage of multi-path environments to transmit multiple spatial layers carrying the same or different coded data.

Preventing Data Loss in a Filesystem by Creating Duplicates of Data in Parallel

Figure 2:
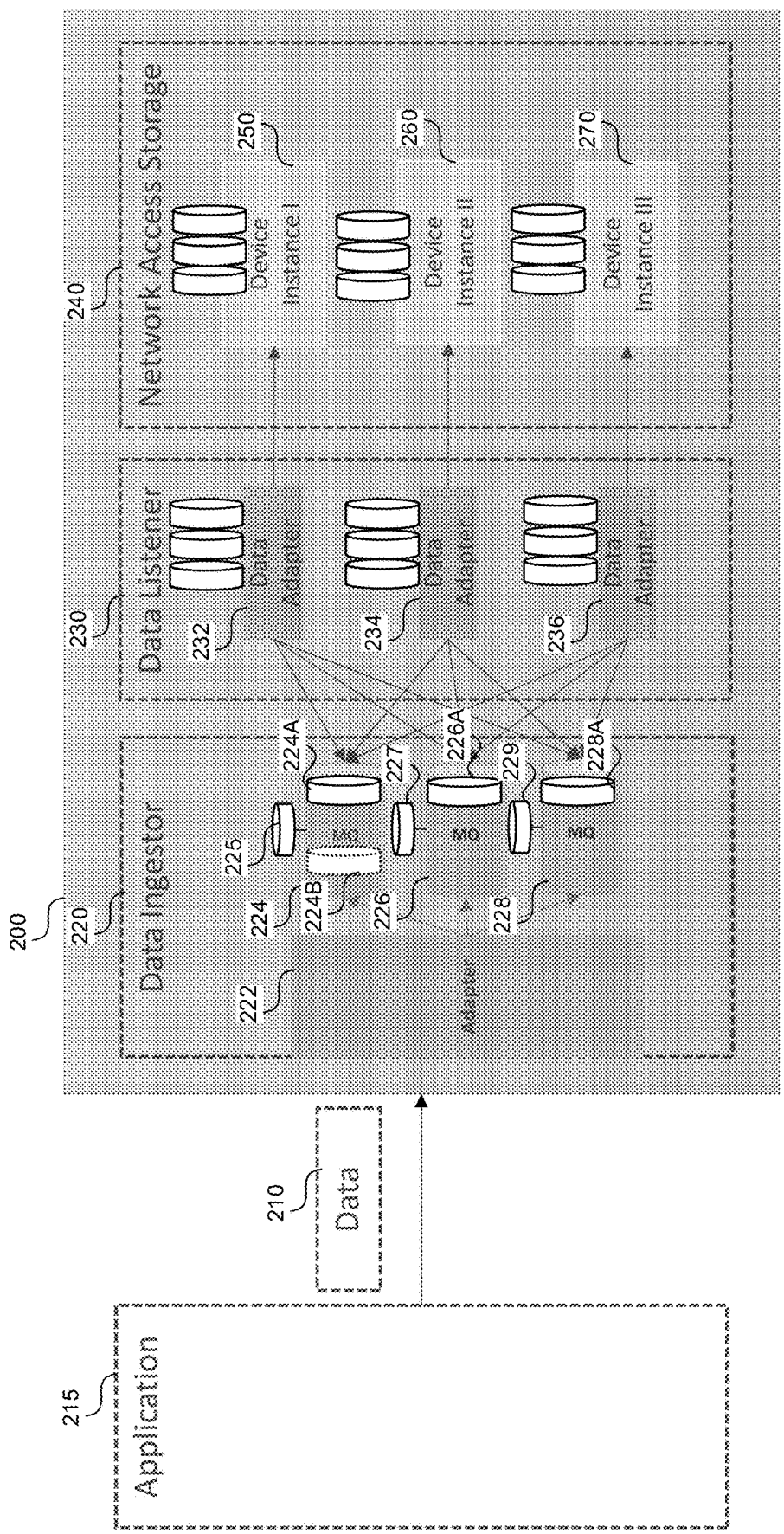
FIG. 2 shows a system to prevent data loss in a filesystem by creating multiple levels of redundancy.

FIG. 2 shows a system to prevent data loss in a filesystem by creating multiple levels of redundancy. The network 100 in FIG. 1, such as a 5G network, can generate vast amounts of data, such as telemetry data. The data can be stored on a primary filesystem. However, for redundancy, there can be another instance of the filesystem hosted within the same data center or a remote disaster recovery data center. The data can be replicated from the primary filesystem to the secondary filesystem in predetermined intervals, such as five-minute intervals. The data coming into the primary filesystem can be coming in at a high rate of 100 gigabytes (GB) every 5 minutes. If the primary filesystem fails, data accumulated between the five-minute intervals is lost. The system 200 can prevent the data loss by creating redundancies at multiple stages of the system and creating those redundancies in parallel, so that loss of one redundancy does not mean loss of the data.

The system 200 can receive data 210 from one or more applications 215. The data 210 can include data from the network 100 in FIG. 1, such as telemetry data. The data can be a service agreement with the network 100, a financing agreement associated with the network 100, or any other type of data that the application 215 wants to store on a hard disk.

The system 200 prevents data loss by creating multiple copies of the data in various stages of data processing. The system 200 includes a data ingestor 220, data listener 230, and network access storage 240.

The data ingestor 220 includes the adapter 222, and multiple queues 224, 226, 228. FIG. 2 shows only two queues 224, 226, 228, but the adapter 222 can have many more queues. The adapter 222 receives the incoming data 210 and distributes the data in a round-robin fashion among the multiple queues 224, 226, 228. Specifically, the adapter 222 orders the queues 224, 226, 228 in a sequence, from first to last. When the adapter 222 receives the initial data 224A, the adapter 222 sends the initial data to the first queue 224 in the sequence. When the adapter 222 receives the subsequent data 226A, the adapter sends the subsequent data to the second queue 226 in the sequence, and so on until the last queue 228 in the sequence is reached. When the last queue 228 in the sequence receives data 228A, the adapter 222 sends the subsequent data 224B to the first queue 224 in the sequence, again, and the process repeats.

Each queue 224, 226, 228 is stored in RAM which provides fast read/write access, with almost no latency. Each queue can have one or more GB of memory. In an initial level of redundancy, the system 200 can create copies of data 210 that is stored in each queue and back the data coming into each queue 224, 226, 228 to memory storage 225, 227, 229. Each memory storage 225, 227, 229, e.g. a disk, can be independent of the other, so if one memory storage 225, 227, 229 fails, the other memory storage is still functioning. The location of the memory storage 225, 227, 229 is physically close to the location of the queues 224, 226, 228, and read/write access to the memory storage occurs with almost no latency, or small latency of up to 3 milliseconds. Consequently, even if a queue 224, 226, 228 fails, the data contained in the queue is preserved in the memory storage 225, 227, 229. If a queue 224, 226, 228 fails, the adapter 222 can recover the contents of the queue, with no data loss, from the memory storage 225, 227, 229.

In a subsequent level of redundancy, the data 224A, 224B, 226A, 228A in the queues 224, 226, 228 is replicated across all the data adapters 232, 234, 236. The data listener 230 includes multiple data adapters 232, 234, 236. FIG. 2 shows only three data adapters 232, 234, 236, but there can be many more. The data adapters 232, 234, 236, can listen for messages indicating that a queue 224, 226, 228 has received data 224A, 224B, 226A, 228A. The queues 224, 226, 228 can send the message to the data adapters 232, 234, 236. Once queue 224, 226, 228 writes to memory and disk 225, 227, 229 acknowledges to the queue that the data 224A, 224B, 226A, 228A has been received, the queue then pushes data to adapters 232, 234, 236. Once adapters 232, 234, 236 acknowledge that data 224A, 224B, 226A, 228A, has been received, queue 224, 226, 228 removes message from memory.

Upon receiving the message indicating that there is new data 224A, 224B, 226A, 228A in the queue 224, 226, 228, each of the data adapters 232, 234, 236, in parallel, obtains a copy of the data 224A, 224B, 226A, 228A, and, in parallel, stores the copy of the data to a data storage device 250, 260, 270 (also known as "device instance"). Consequently, the incoming data is duplicated by the data ingestor 220 and by the data listener 230.

The data storage devices 250, 260, 270 are part of the network access storage 240. FIG. 2 shows only three data storage devices 250, 260, 270 but there can be two or more data storage devices. Each data storage device 250, 260, 270 can correspond to one data adapter 232, 234, 236. Each data storage device 250, 260, 270 can operate independently of the other data storage devices, so that if a single data storage device fails, other data storage devices can keep operating, and can provide access to the data stored on the failed storage device. Because the data is stored in parallel on the multiple data storage devices 250, 260, 270, the multiple data storage devices can be exact copies of each other, and no data is lost when even multiple data storage devices 250, 260, 270 fail.

Each data storage device 250, 260, 270 is a network device meaning that it is physically remote from the queues 224, 226, 228, and that read/write latency of the data storage devices is higher than read/write latency of memory storage 225, 227, 229. For example, the latency of the data storage 250, 260, 270 devices can be 400 ms, compared to the latency of 3 ms for the memory storage 225, 227, 229. The size of memory storage 225, 227, 229 is smaller than the size of data storage device 250, 260, 270. Consequently, the memory storage 225, 227, 229 needs to be periodically cleaned, while data storage device 250, 260, 270 needs never be cleaned. The memory storage 225, 227, 229 can be cleaned at a predetermined amount of time, such as every seven hours.

Figure 3:
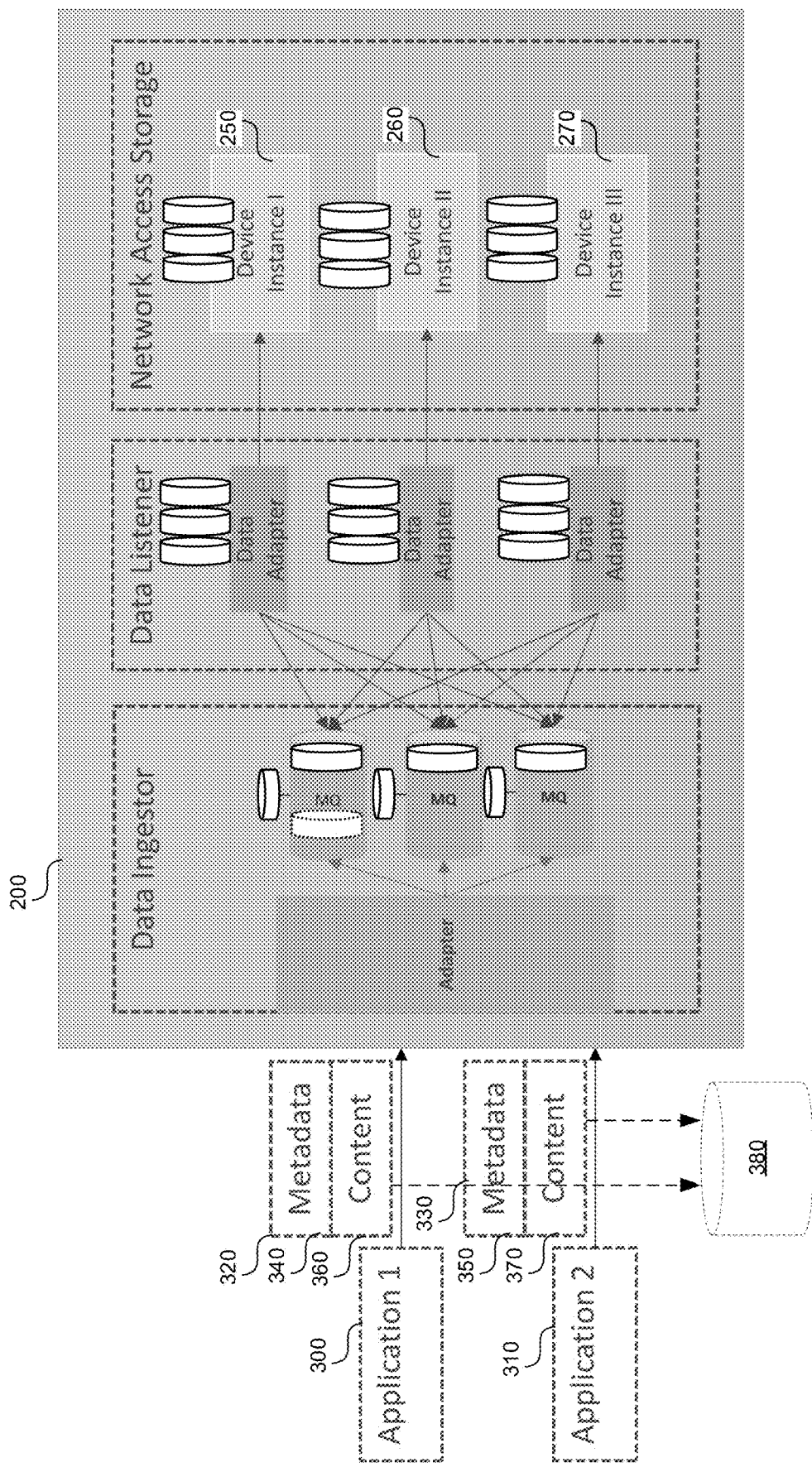
FIG. 3 shows the use of metadata to determine which data belongs to which application.

FIG. 3 shows the use of metadata to determine which data belongs to which application. There can be multiple applications 300, 310 communicating with the system 200. Each application can send its data 320, 330 to the system 200. The data 320, 330 can include metadata 340, 350, and content data 360, 370, respectively. The metadata 340, 350 can denote to which application 300, 310 the content data 360, 370 belongs. The system 200 can store the metadata 340, 350 along with the data in the data storage devices 250, 260, 270, or the system can store the metadata in a separate database 380. When the system 200 retrieves the content data 360, 370 from the data storage device 250, 260, 270 the system can also retrieve the metadata 340, 350 to determine to which application each of the content data 360, 370 belongs.

Figure 4:
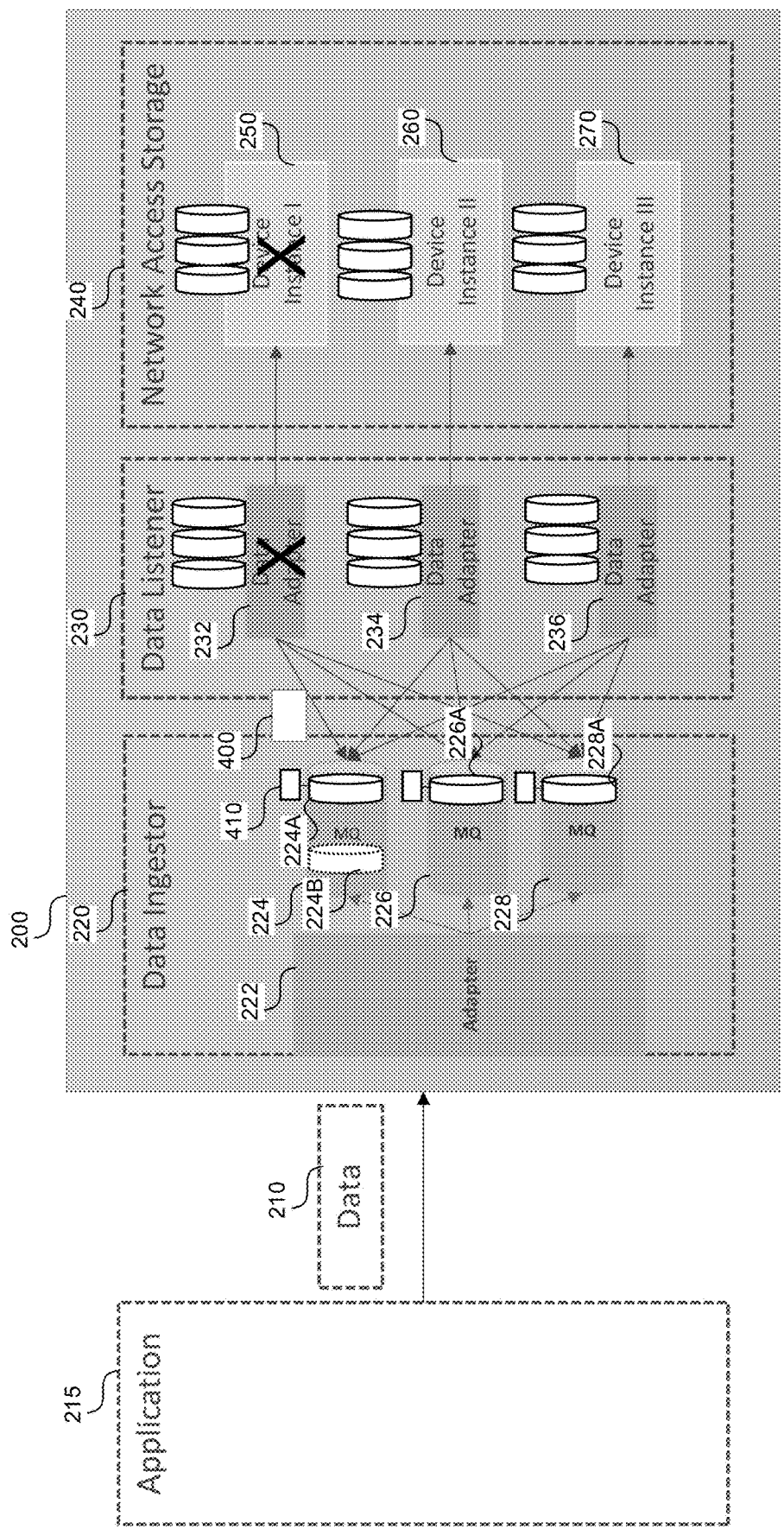
FIG. 4 shows a system to accommodate a failure of a data adapter or a data storage device.

FIG. 4 shows a system to accommodate a failure of a data adapter or a data storage device. The queues 224, 226, 228 and the data adapters 232, 234, 236 can pass messages 400 (only one shown for brevity) to each other. For example, the queue 224, 226, 228 can send the message 400 to the data adapter 232, 234, 236 to indicate that a queue 224, 226, 228 has received new data 224A, 224B, 226A, 228A. The data adapter 232, 234, 236 can send the message 400 to the queue to the 224, 226, 228 to request the new data 224A, 224B, 226A, 228A. The queue 224, 226, 228 can send the message 400 to the data adapter 232, 234, 236 including the new data 224A, 224B, 226A, 228A. Upon receiving the new data 224A, 224B, 226A, 228A, the data adapter 232, 234, 236 can send the message 400 acknowledging the receipt of the new data.

If the data adapter 232, 234, 236 and/or the data storage device 250, 260, 270 fail, the flow of messages described above is disrupted and the queue 224, 226, 228 does not receive the final message 400 acknowledging the receipt of the new data 224A, 224B, 226A, 228A. Consequently, the queue 224, 226, 228 can preserve the new data 224A, 224B, 226A, 228A until the data adapter 232, 234, 236 and/or the data storage device 250, 260, 270 come online.

To preserve the new data, the queue 224, 226, 228 can obtain a unique identifier (ID) 410 (only one labeled for brevity) of each data adapter 232, 234, 236. Upon receiving the new data 224A, 224B, 226A, 228A, the queue 224, 226, 228 can check whether the queue has received the message 400 acknowledging the receipt of the new data from each ID 410. If the queue 224, 226, 228 does not have the messages 400 including the ID 410 from each data adapter 232, 234, 236, the queue can keep the new data 224A, 224B, 226A, 228A in memory until the queue receives acknowledgment from each data adapter.

If the data storage device 250, 260, 270 fails, while the corresponding data adapter 232, 234, 236 is still operational, the data adapter can store the new data 224A, 224B, 226A, 228A in memory until the corresponding storage device comes online.

Figure 5:
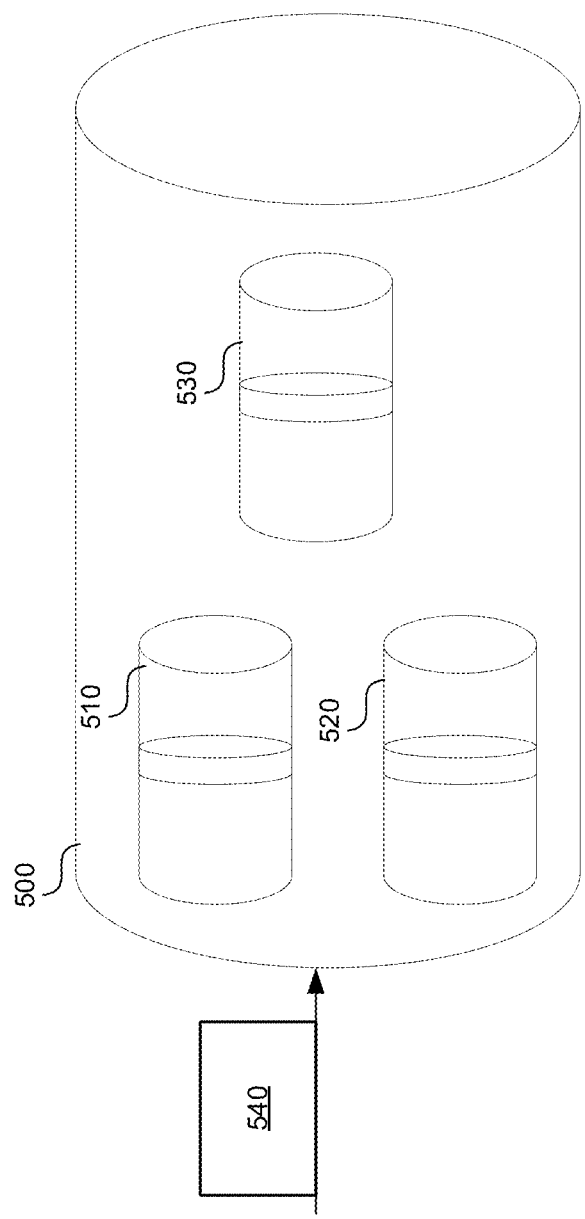
FIG. 5 shows a sub-queue within a queue.

FIG. 5 shows a sub-queue within a queue. The queue 500 can be any one of the queues 224, 226, 228 in FIG. 2. In a third level of redundancy, each queue 500 can have multiple sub-queues 510, 520, 530, such as three sub-queues. Each sub-queue is a copy of the other sub-queues 510, 520, 530. Each sub-queue is independent of the rest of the sub-queues 510, 520, 530, and if one sub-queue fails, the other sub-queues can continue operating. When the queue 500 receives the data 540, the data is copied a number of times equal to the number of sub-queues 510, 520, 530, and each data copy is stored in one of the sub-queues.

Figure 6:
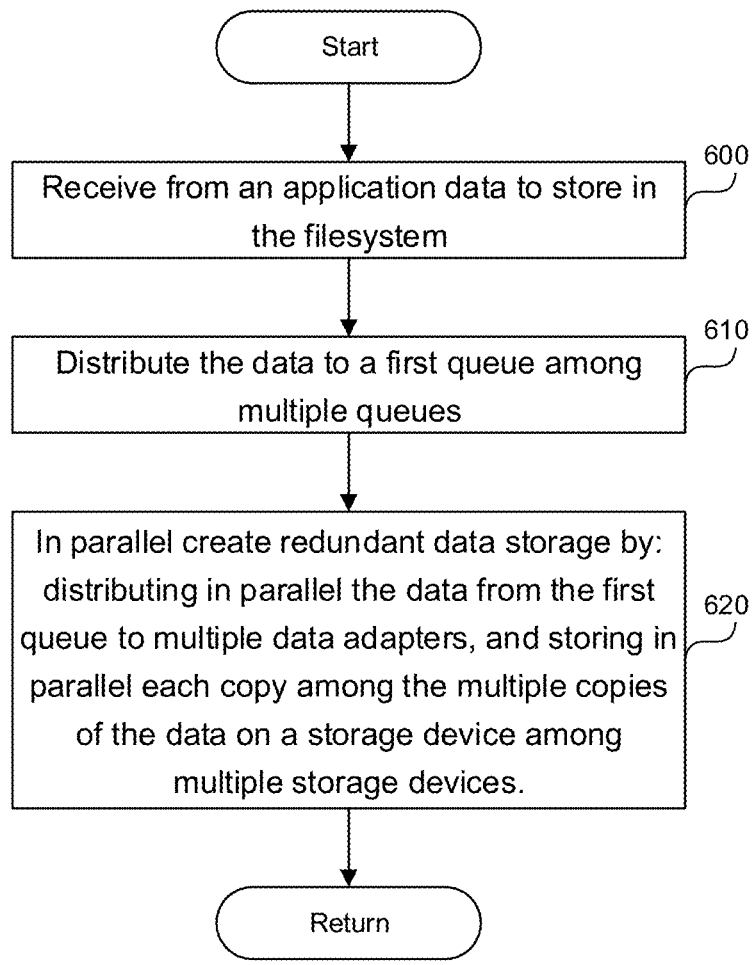
FIG. 6 is a flowchart of a method to prevent data loss in a filesystem.

FIG. 6 is a flowchart of a method to prevent data loss in a filesystem. In step 600, a hardware or software processor executing instructions described in this application can receive, from an application, data to store in the filesystem.

In step 610, the processor can distribute the data to a first queue among multiple queues. The queue can be stored in RAM memory for easy and fast read/write access. The multiple queues are ordered in a sequence, wherein an initial queue in the sequence follows a last queue in the sequence. The processor can distribute the data in a round-robin fashion. Specifically, the processor can distribute the data to the first queue following a second queue that has received preceding data.

In step 620, the processor can in parallel create redundant data storage by performing at least two steps. First, the processor can distribute in parallel the data from the first queue to multiple data adapters. To distribute, the processor can create multiple copies of the data, and can send a copy among the multiple copies of the data to a data adapter among the multiple data adapters. Each adapter among the multiple data adapters can be configured to receive data from each queue among the multiple queues. Second, the processor can store in parallel each copy among the multiple copies of the data on a storage device among multiple data storage devices. Each storage device among the multiple data storage devices can correspond to each data adapter among the multiple data adapters.

The processor can account for a data adapter or storage device failing. The first queue among the multiple data queues can obtain a unique ID associated with the data adapter among the multiple data adapters. The first queue can send the data to the data adapter. The first queue can determine whether a message including the ID associated with the data adapter acknowledging receipt of the data is received by the first queue. Upon determining that the message acknowledging the receipt of the data is not received by the first queue, the first queue can store the data until the message including the ID associated with the data adapter acknowledging receipt of the data is received by the first queue.

If no adapter and/or storage devices fail, the processor can remove the data from the first queue. Specifically, the first queue can obtain multiple unique IDs associated with the multiple data adapters. The first queue can send the data to the multiple data adapters. The first queue can determine whether multiple messages including the multiple unique IDs associated with the multiple data adapters acknowledging receipt of the data are received by the first queue, by determining whether the multiple messages include a unique ID of each data adapter among the multiple data adapters. Upon determining that the multiple messages include a unique ID of each data adapter among the multiple data adapters, the first queue can remove the data.

Since multiple applications can be interacting with the system, the processor can keep track which data belongs to which application. The processor can receive the data including a metadata and content data, where the metadata includes an ID associated with the content data and an ID associated with the application. The metadata can identify the application associated with the content data. The processor can store the ID associated with the content data and the content data on the storage device. Based on the metadata, the processor can determine the application associated with the content data.

In addition to the replication of data across the data storage devices, the processor can duplicate the data stored in the queue. The processor can synchronously with distributing the data to the first queue, distribute the data to a second storage device configured to store a copy of the contents associated with the first queue. The second storage device can be physically close to the RAM memory storing the queue, and closer than the data storage device. Consequently, accessing the second storage devices is faster than accessing the storage device. The second storage device can provide backup of the data when the first queue fails.

In addition to the replication of data across the data storage devices and the second storage devices, the processor can duplicate the queues in the RAM memory. The processor can create multiple sub-queues associated with the first queue. Upon distributing the data to the first queue, the processor can create multiple copies of the data, where the number of the multiple copies of the data corresponds to the number of the multiple sub-queues. The processor can distribute a copy of the data among the multiple copies of the data to a sub-queue among the multiple sub-queues.

The RAM memory storing the queues is not as large as the memory of the data storage devices. Consequently, the RAM memory needs to be periodically cleaned to make room for incoming data. The processor can establish a predetermined amount of time, such as seven hours, after which the RAM memory is expected to be close to or completely full. The processor can remove the data from the second storage device after the predetermined the amount of time.

Figure 7:
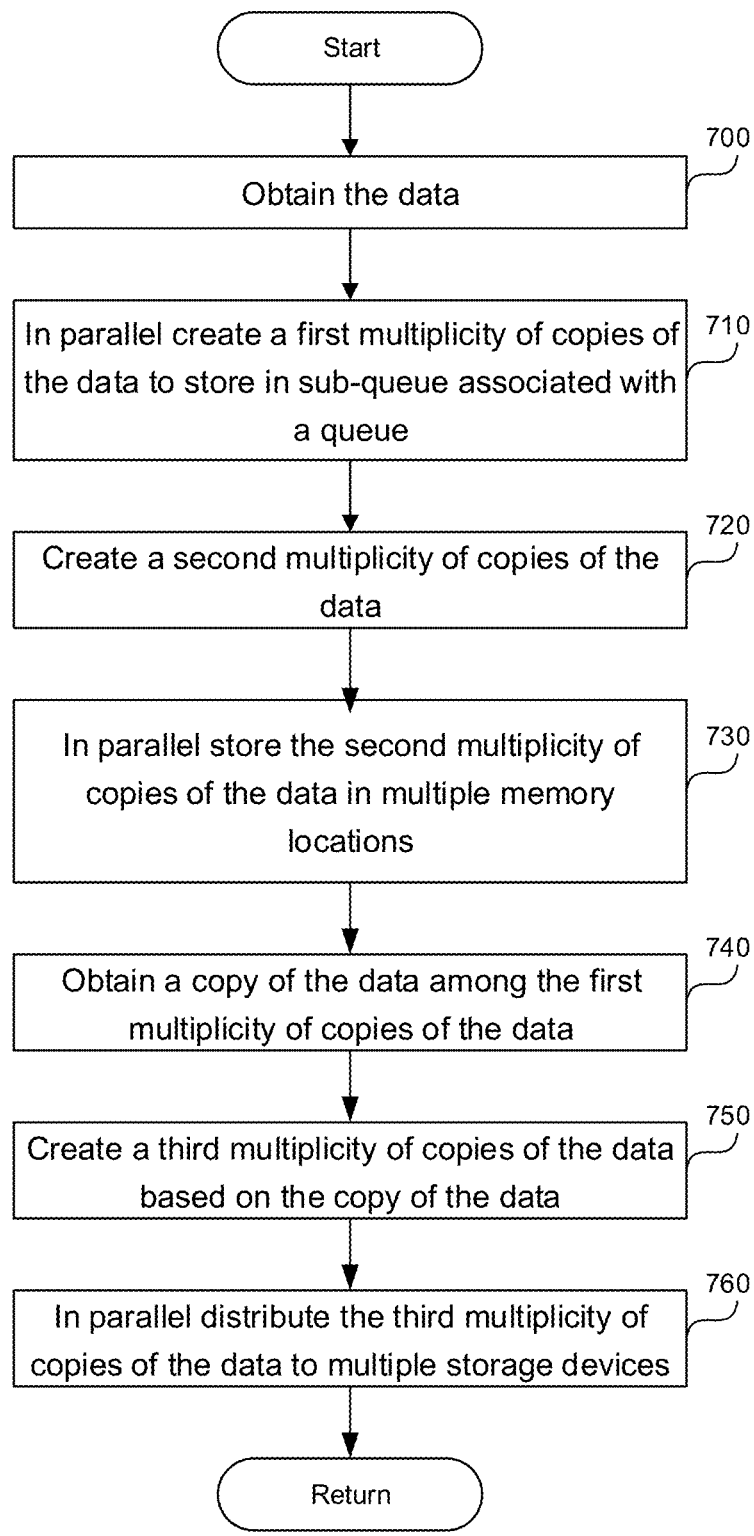
FIG. 7 is a flowchart of a method to prevent data loss in a filesystem by creating duplicates of data in parallel.

FIG. 7 is a flowchart of a method to prevent data loss in a filesystem by creating duplicates of data in parallel. In step 700, the processor can obtain the data. In step 710, the processor can in parallel create a first multiplicity of copies of the data to store in a sub-queue associated with a queue. In step 720, the processor can create a second multiplicity of copies of the data.

In step 730, the processor can in parallel store the second multiplicity of copies of the data in multiple memory locations. A memory location among the multiple memory locations can be the memory storage 225, 227, 229 in FIG. 2. The memory location can be configured to operate when another memory location among the multiple memory locations fails. Upon receiving the data to store in the queue, the processor can distribute the data among the queues and/or sub-queues in a round-robin fashion. Synchronously with distributing the data to the queue and/or sub-queue, the processor can distribute the data to the memory location configured to store a copy of the contents associated with the queue. Accessing the memory location is faster than accessing the data storage device because the memory location is physically closer to the location of the memory storing the queue. In addition, the memory location can have a faster read/write access. Memory location is configured to provide backup of the data when the queue fails.

In step 740, the processor can obtain a copy of the data among the first multiplicity of copies of the data.

In step 750, the processor can create a third multiplicity of copies of the data based on the copy of the data.

In step 760 the processor can in parallel distribute the third multiplicity of copies of the data to multiple data storage devices, where a data storage device among the multiple data storage devices is configured to operate when another data storage device among the multiple data storage devices fails.

To distribute in parallel the third multiplicity of copies of the data to multiple data storage devices, the processor can send a copy among the third multiplicity of copies of the data to a data adapter among multiple data adapters. Each adapter among the multiple data adapters can be configured to receive data from each queue among the multiple queues. The processor can store in parallel each copy among the second multiplicity of copies of the data on a storage device among multiple data storage devices. Each storage device among the multiple data storage devices can correspond to each data adapter among the multiple data adapters.

The processor can account for a data adapter or storage device failing. The processor can obtain a unique ID associated with the data storage device among the multiple data storage devices. The processor can send a data copy among the second multiplicity of copies to the data storage device. The processor can determine whether a message including the ID associated with the data storage device acknowledging receipt of the data copy is received. Upon determining that the message acknowledging the receipt of the data copy is not received, the processor can continue storing the data copy until the message including the ID associated with the data storage device acknowledging receipt of the data copy is received by the queue.

If no adapter and/or storage devices fail, the processor can remove the data. The processor can obtain multiple unique IDs associated with the multiple data storage devices. The processor can send a data copy among the second multiplicity of copies to the multiple data storage devices. The processor can determine whether multiple messages including the multiple unique IDs associated with the multiple data storage devices acknowledging receipt of the data copy are received by the queue, by determining whether the multiple messages include a unique ID of each data storage device among the multiple data storage devices. Upon determining that the multiple messages include a unique ID of each data storage device among the multiple data storage devices, the processor can remove the data copy. In addition, the processor can perform other instructions described in this application.

Computer System

Figure 8:
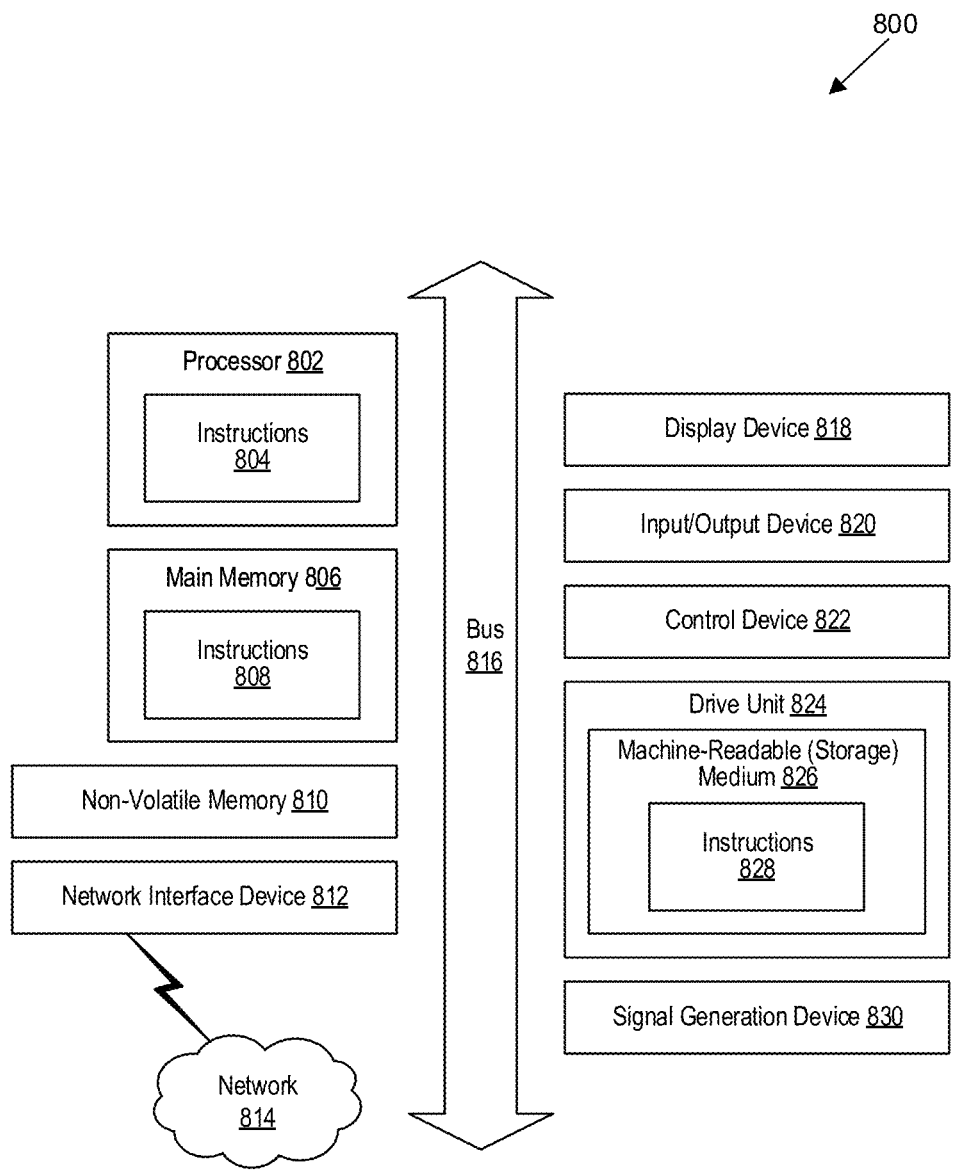
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include one or more processors 802, main memory 806, non-volatile memory 810, a network interface device 812, video display device 818, an input/output device 820, a control device 822 (e.g., keyboard and pointing device), a drive unit 824 that includes a storage medium 826, and a signal generation device 830, all of which are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the Figures and any other components described in this specification can be implemented.

The computer system 800 can take any suitable physical form. For example, the computing system 800 can share a similar architecture as that of a server computer, personal computer, tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-onchip, a single-board computer system, or a distributed system such as a mesh of computer systems or include one or more cloud components in one or more networks. Where appropriate, one or more computer systems 800 can perform operations in real time, near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable (storage) medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," ""comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

I claim:

1. At least one computer-readable storage medium, excluding transitory signals and carrying instructions to prevent data loss in a filesystem storing data associated with a wireless telecommunication network, which, when executed by at least one data processor of a system, cause the system to:
   receive, from an application, data to store in the filesystem,
      wherein the filesystem stores data coming in at a rate exceeding 10 gigabytes per minute,
      wherein the data is associated with the wireless telecommunication network;
   distribute the data to a first queue among multiple queues,
      wherein the multiple queues are ordered in a sequence,
      wherein an initial queue in the sequence follows a last queue in the sequence, and
      wherein the data is distributed to the first queue following a second queue that has received preceding data;
   in parallel create redundant data storage by:
      distributing in parallel the data from the first queue to multiple data adapters,
      the distributing including:
      creating multiple copies of the data;
      sending a copy of the data among the multiple copies of the data to a data adapter among the multiple data adapters,
         wherein each adapter among the multiple data adapters is configured to receive the copy of the data from any one queue among the multiple queues; and
      storing in parallel each copy among the multiple copies of the data on a storage device among multiple data storage devices,
         wherein each storage device among the multiple data storage devices corresponds to one data adapter among the multiple data adapters; and
   synchronously with distributing the data to the first queue, distribute the data to a second storage device configured to store a copy of contents associated with the first queue,
      wherein accessing the second storage device is faster than accessing the storage device, and
      wherein the second storage device is configured to provide backup of the data when the first queue fails.

2. The at least one computer-readable storage medium of claim 1, wherein instructions to create in parallel redundant data storage comprise instructions to:
   obtain, by the first queue among the multiple queues, a unique ID associated with the data adapter among the multiple data adapters;
   send, by the first queue among the multiple queues, the copy of the data to the data adapter;
   determine, by the first queue among the multiple queues, whether a message including the unique ID associated with the data adapter acknowledging receipt of the copy of the data is received by the first queue; and
   upon determining that the message acknowledging the receipt of the copy of the data is not received by the first queue, store the copy of the data in the first queue until the message including the unique ID associated with the data adapter acknowledging receipt of the copy of the data is received by the first queue.

3. The at least one computer-readable storage medium of claim 1, wherein instructions to create in parallel redundant data storage comprise instructions to:
   obtain, by the first queue among the multiple queues, multiple unique IDs associated with the multiple data adapters;
   send, by the first queue among the multiple queues, the copy of the data to the multiple data adapters;
   determine, by the first queue among the multiple queues, whether multiple messages including the multiple unique IDs associated with the multiple data adapters acknowledging receipt of the copy of the data are received by the first queue, by determining whether the multiple messages include a unique ID of each data adapter among the multiple data adapters; and
   upon determining that the multiple messages include the unique ID of each data adapter among the multiple data adapters, remove the copy of the data from the first queue.

4. The at least one computer-readable storage medium of claim 1, comprising instructions to:
   receive the data including a metadata and content data,
      wherein the metadata includes an ID associated with the content data and an ID associated with the application, and
      wherein the metadata identifies the application associated with the content data;
   store the ID associated with the content data and the content data on the storage device; and
   based on the metadata, determine the application associated with the content data.

5. The at least one computer-readable storage medium of claim 1, comprising instructions to:
   create multiple sub-queues associated with the first queue;
   upon distributing the data to the first queue, create second multiplicity of copies of the data,
      wherein a number of the second multiplicity of copies of the data corresponds to a number of the multiple sub-queues; and distribute a second copy of the data among the second multiplicity of copies of the data to a sub-queue among the multiple sub-queues.

6. The at least one computer-readable storage medium of claim 1 comprising instructions to:
synchronously with distributing the data to the first queue, distribute the data to a second storage device configured to store a copy of contents associated with the first queue,
wherein accessing the second storage device is faster than accessing the storage device,
wherein the second storage device is configured to provide backup of the data when the first queue fails,
wherein the second storage device has less memory than the storage device; and
obtain a predetermined amount of time; and
remove the data from the second storage device after the predetermined amount of time.

7. A system comprising:
at least one hardware processor; and
at least one non-transitory memory storing instructions, which, when executed by the at least one hardware processor, causes the system to:
receive data to store in a filesystem from an application;
distribute the data to a queue among multiple queues;
in parallel create redundant data storage by:
distributing in parallel the data from the queue to multiple data adapters, the distributing including:
creating multiple copies of the data;
sending a copy of the data among the multiple copies of the data to a data adapter among the multiple data adapters,
wherein each adapter among the multiple data adapters is configured to receive the copy of the data from each queue among the multiple queues; and
storing in parallel each copy among the multiple copies of the data on a storage device among multiple data storage devices,
wherein the storage device among the multiple data storage devices corresponds to the data adapter among the multiple data adapters; and
create multiple sub-queues associated with the queue;
upon distributing the data to the queue, create a second multiplicity of copies of the data,
wherein a number of the second multiplicity of copies of the data corresponds to a number of the multiple sub-queues; and
distribute a second copy of the data among the second multiplicity of copies of the data to a sub-queue among the multiple sub-queues.

8. The system of claim 7, wherein instructions to create in parallel redundant data storage comprise instructions to:
obtain, by the queue among the multiple queues, a unique ID associated with the data adapter among the multiple data adapters;
send, by the queue among the multiple queues, the copy of the data to the data adapter;
determine, by the queue among the multiple queues, whether a message including the unique ID associated with the data adapter acknowledging receipt of the copy of the data is received by the queue; and
upon determining that the message acknowledging the receipt of the data is not received by the queue, store the copy of the data in the queue until the message including the unique ID associated with the data adapter acknowledging receipt of the copy of the data is received by the queue.

9. The system of claim 7, wherein instructions to create in parallel redundant data storage comprise instructions to:
obtain, by the queue among the multiple queues, multiple unique IDs associated with the multiple data adapters;
send, by the queue among the multiple queues, the copy of the data to the multiple data adapters;
determine, by the queue among the multiple queues, whether multiple messages including the multiple unique IDs associated with the multiple data adapters acknowledging receipt of the copy of the data are received by the queue, by determining whether the multiple messages include a unique ID of each data adapter among the multiple data adapters; and
upon determining that the multiple messages include the unique ID of each data adapter among the multiple data adapters, remove the copy of the data from the queue.

10. The system of claim 7, comprising instructions to:
receive the data including a metadata and content data,
wherein the metadata includes an ID associated with the content data and an ID associated with the application, and
wherein the metadata identifies the application associated with the content data;
store the ID associated with the content data and the content data on the storage device; and
based on the metadata, determine the application associated with the content data.

11. The system of claim 7, comprising instructions to:
synchronously with distributing the data to the queue, distribute the data to a second storage device configured to store a copy of contents associated with the queue,
wherein accessing the second storage device is faster than accessing the storage device, and
wherein the second storage device is configured to provide backup of the data when the queue fails.

12. The system of claim 7, comprising instructions to:
synchronously with distributing the data to the queue, distribute the data to a second storage device configured to store a copy of contents associated with the queue,
wherein accessing the second storage device is faster than accessing the storage device,
wherein the second storage device is configured to provide backup of the data when the queue fails,
wherein the second storage device has less memory than the storage device; and
establish a predetermined amount of time; and
remove the data from the second storage device after the predetermined amount of time.

13. The system of claim 7, comprising instructions to:
order the multiple queues in a sequence,
wherein an initial queue in the sequence follows a last queue in the sequence, and
distribute the data to the queue following a second queue, wherein the second queue has received preceding data.

14. A system comprising:
at least one hardware processor; and
at least one non-transitory memory storing instructions, which, when executed by the at least one hardware processor, cause the system to:
prevent data loss in a filesystem by creating duplicates of data in parallel, including instructions to:
obtain data;

in parallel create a first multiplicity of copies of the data to store in a sub-queue associated with a queue;
create a second multiplicity of copies of the data;
in parallel store the second multiplicity of copies of the data in multiple memory locations,
  wherein a memory location among the multiple memory locations is configured to operate when another memory location among the multiple memory locations fails,
  wherein the instructions to in parallel store include:
    distribute the data to the queue among multiple queues,
      wherein the multiple queues are ordered in a sequence, wherein an initial queue in the sequence follows a last queue in the sequence, and
      wherein the data is distributed to the queue following a second queue that has received preceding data;
obtain a copy of the data among the first multiplicity of copies of the data;
create a third multiplicity of copies of the data based on the copy of the data; and
in parallel distribute the third multiplicity of copies of the data to multiple data storage devices,
  wherein a data storage device among the multiple data storage devices is configured to operate when another data storage device among the multiple data storage devices fails; and
synchronously with distributing the data to the queue, distribute the data to the memory location configured to store a copy of contents associated with the queue,
  wherein accessing the memory location is faster than accessing the data storage device,
  wherein the memory location is configured to provide backup of the data when the queue fails.

15. The system of claim 14, instructions to in parallel distribute the third multiplicity of copies of the data to the multiple data storage devices, comprising instructions to:
send a third copy among the third multiplicity of copies of the data to a data adapter among multiple data adapters,
  wherein each adapter among the multiple data adapters is configured to receive the third copy of the data from each queue among multiple queues; and
store in parallel each copy among the third multiplicity of copies of the data on a storage device among the multiple data storage devices,
  wherein each storage device among the multiple data storage devices corresponds to each data adapter among the multiple data adapters.

16. The system of claim 14, wherein instructions to in parallel distribute the third multiplicity of copies of the data to the multiple data storage devices, comprise instructions to:
obtain a unique ID associated with the data storage device among the multiple data storage devices;
send a data copy among the second multiplicity of copies to the data storage device;
determine whether a message including the unique ID associated with the data storage device acknowledging receipt of the data copy is received; and
upon determining that the message acknowledging the receipt of the data copy is not received, continue storing the data copy until the message including the unique ID associated with the data storage device acknowledging receipt of the data copy is received by the queue.

17. The system of claim 14, instructions to in parallel distribute the third multiplicity of copies of the data to the multiple data storage devices, comprising instructions to:
obtain multiple unique IDs associated with the multiple data storage devices;
send a data copy among the second multiplicity of copies to the multiple data storage devices;
determine whether multiple messages including the multiple unique IDs associated with the multiple data storage devices acknowledging receipt of the data copy are received by the queue, by determining whether the multiple messages include a unique ID of each data storage device among the multiple data storage devices; and
upon determining that the multiple messages include the unique ID of each data storage device among the multiple data storage devices, remove the data copy.

* * * * *